(12) United States Patent
Haerr et al.

(10) Patent No.: US 6,612,108 B2
(45) Date of Patent: *Sep. 2, 2003

(54) MANIFOLD ASSEMBLY FOR INTERCONNECTING BRAKE BOOSTER TO ENGINE AND VACUUM PUMP

(75) Inventors: Timothy A. Haerr, Enon, OH (US); Gary C. Fulks, Spring Valley, OH (US); Michel J. Vermoesen, Pittsfield, MA (US); Kenneth C. Williams, Hamilton, OH (US); William R. Peltz, Huber Heights, OH (US)

(73) Assignee: Delphi Technologies, Inc., Troy, MI (US)

( * ) Notice: Subject to any disclaimer, the term of this patent is extended or adjusted under 35 U.S.C. 154(b) by 92 days.

This patent is subject to a terminal disclaimer.

(21) Appl. No.: 09/991,614

(22) Filed: Nov. 6, 2001

(65) Prior Publication Data

US 2003/0084662 A1 May 8, 2003

(51) Int. Cl.$^7$ .............................................. F16D 31/02
(52) U.S. Cl. .............................. 60/397; 60/405; 60/412
(58) Field of Search .................... 60/397, 405, 412, 60/582

(56) References Cited

U.S. PATENT DOCUMENTS

| | | | | |
|---|---|---|---|---|
| 2,910,327 A | * | 10/1959 | Blair | 60/397 |
| 3,094,843 A | * | 6/1963 | Martin | 60/404 |
| 3,792,762 A | * | 2/1974 | Ball et al. | 477/182 |
| 3,824,792 A | * | 7/1974 | Grabb et al. | 60/411 |
| 4,332,302 A | * | 6/1982 | Kosmanski | 60/412 |
| 4,730,999 A | * | 3/1988 | Tsukuda et al. | 60/397 |
| 6,209,442 B1 | | 4/2001 | Haerr et al. | |
| 6,301,883 B1 | | 10/2001 | Fulks et al. | 60/397 |

* cited by examiner

*Primary Examiner*—Edward K. Look
*Assistant Examiner*—Igor Kershteyn
(74) *Attorney, Agent, or Firm*—Scott A. McBain (57) ABSTRACT

A manifold assembly for pneumatically interconnecting a brake booster to an engine and to an electrically-driven vacuum pump. A manifold housing has an engine port pneumatically communicable with the engine, a separate booster port pneumatically communicable with the brake booster, and an orifice pneumatically communicable with the vacuum pump inlet. An engine check valve substantially blocks pneumatic flow from the engine port to the booster port. A vacuum-pump check valve substantially blocks pneumatic flow from the engine port to the vacuum pump outlet.

20 Claims, 10 Drawing Sheets

MANIFOLD ASSEMBLY FOR INTERCONNECTING BRAKE BOOSTER TO ENGINE AND VACUUM PUMP

TECHNICAL FIELD

The present invention relates generally to brake boosters, and more particularly to a manifold assembly for pneumatically interconnecting a brake booster to an engine and to an electrically-driven vacuum pump.

BACKGROUND OF THE INVENTION

Automotive vehicles include those with booster-assisted brakes. The engine intake manifold acts as a vacuum source drawing air from the brake booster which is operatively connected to the master brake cylinder. In one known design, a full-time electrically-driven vacuum pump, the engine intake manifold, and the brake booster are pneumatically attached together in a "Y" configuration without the use of an interconnecting manifold, wherein the brake booster contains various check valves.

What is needed is a manifold assembly for pneumatically interconnecting a brake booster to an engine and to an electrically-driven vacuum pump.

SUMMARY OF THE INVENTION

A first expression of a first embodiment of the invention is for a manifold assembly for pneumatically interconnecting an engine to a brake booster and for pneumatically interconnecting an inlet of an electrically-driven vacuum pump to the brake booster and an outlet of the vacuum pump to the engine. In the first expression, the manifold assembly includes an open-top manifold housing coverable by a manifold cover. The open-top manifold housing includes an engine port, a booster port, an orifice, an engine check valve, and a vacuum-pump check valve. The engine port is pneumatically communicable with the engine, The booster port is separate from the engine port and is pneumatically communicable with the brake booster. The orifice is pneumatically communicable with the inlet of the vacuum pump. The engine check valve allows pneumatic flow from the booster port to the engine port but substantially blocks pneumatic flow from the engine port to the booster port. The vacuum-pump check valve allows pneumatic flow from the outlet of the vacuum pump to the engine port but substantially blocks pneumatic flow from the engine port to the outlet of the vacuum pump.

A second expression of a first embodiment of the invention is for a manifold assembly for pneumatically interconnecting an engine to a brake booster and for pneumatically interconnecting an inlet of an electrically-driven vacuum pump to the brake booster and an outlet of the vacuum pump to the engine. In the second expression, the manifold assembly includes a manifold housing. The manifold housing includes an engine port, a booster port, an orifice, an engine check valve, and a vacuum-pump check valve. The engine port is pneumatically communicable with the engine, The booster port is separate from the engine port and is pneumatically communicable with the brake booster. The orifice is pneumatically communicable with the inlet of the vacuum pump. The engine check valve allows pneumatic flow from the booster port to the engine port but substantially blocks pneumatic flow from the engine port to the booster port. The vacuum-pump check valve allows pneumatic flow from the outlet of the vacuum pump to the engine port but substantially blocks pneumatic flow from the engine port to the outlet of the vacuum pump.

A third expression of a first embodiment of the invention is for a manifold assembly for pneumatically interconnecting an automotive engine to a brake booster and for pneumatically interconnecting an inlet of an automotive-battery-driven vacuum pump to the brake booster and an outlet of the vacuum pump to the engine. In the first expression, the manifold assembly includes a manifold housing. The manifold housing includes an engine port, a booster port, an orifice, an engine check valve, a vacuum-pump check valve, a valve enclosure portion, and a pressure sensor receptacle. The engine port is pneumatically communicable with the engine, The booster port is separate from the engine port and is pneumatically communicable with the brake booster. The orifice is pneumatically communicable with the inlet of the vacuum pump. The engine check valve allows pneumatic flow from the booster port to the engine port but substantially blocks pneumatic flow from the engine port to the booster port. The vacuum-pump check valve allows pneumatic flow from the outlet of the vacuum pump to the engine port but substantially blocks pneumatic flow from the engine port to the outlet of the vacuum pump. The valve enclosure portion is in pneumatic communication with the engine port, contains the engine check valve, and contains the vacuum-pump check valve.

Several benefits and advantages are derived from one or more of the expressions of a first embodiment of the invention. The manifold assembly reduces the number of parts otherwise required resulting in lower material costs, lower manufacturing costs, and higher quality. The manifold assembly frees up space that would otherwise be taken up by extensive plumbing connections. The manifold assembly acts as a noise reduction chamber and also routes the noise of the vacuum pump to the engine as can be appreciated by the artisan. The manifold assembly arrangement for the vacuum-pump check valve allows the vacuum-pump check valve to also act as an elastomeric valve which increases the performance of the vacuum pump by preventing backflow into the pump as can be appreciated by those skilled in the art. The pressure sensor receptacle can hold a differential-pressure-sensing sensor which can be used to activate and deactivate the vacuum pump such as activating the vacuum pump in the event of engine failure.

DESCRIPTION OF THE PREFERRED EMBODIMENTS

Figure 1:
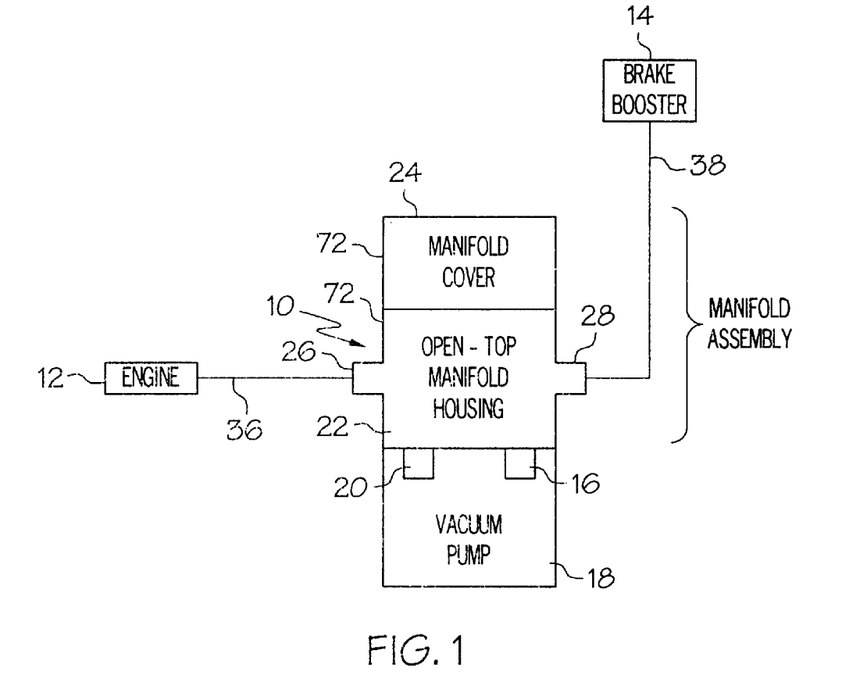
FIG. 1 is a block diagram of a manifold assembly of the invention pneumatically interconnected to an engine, a brake booster, and an electrically-driven vacuum pump.
Figure 2:
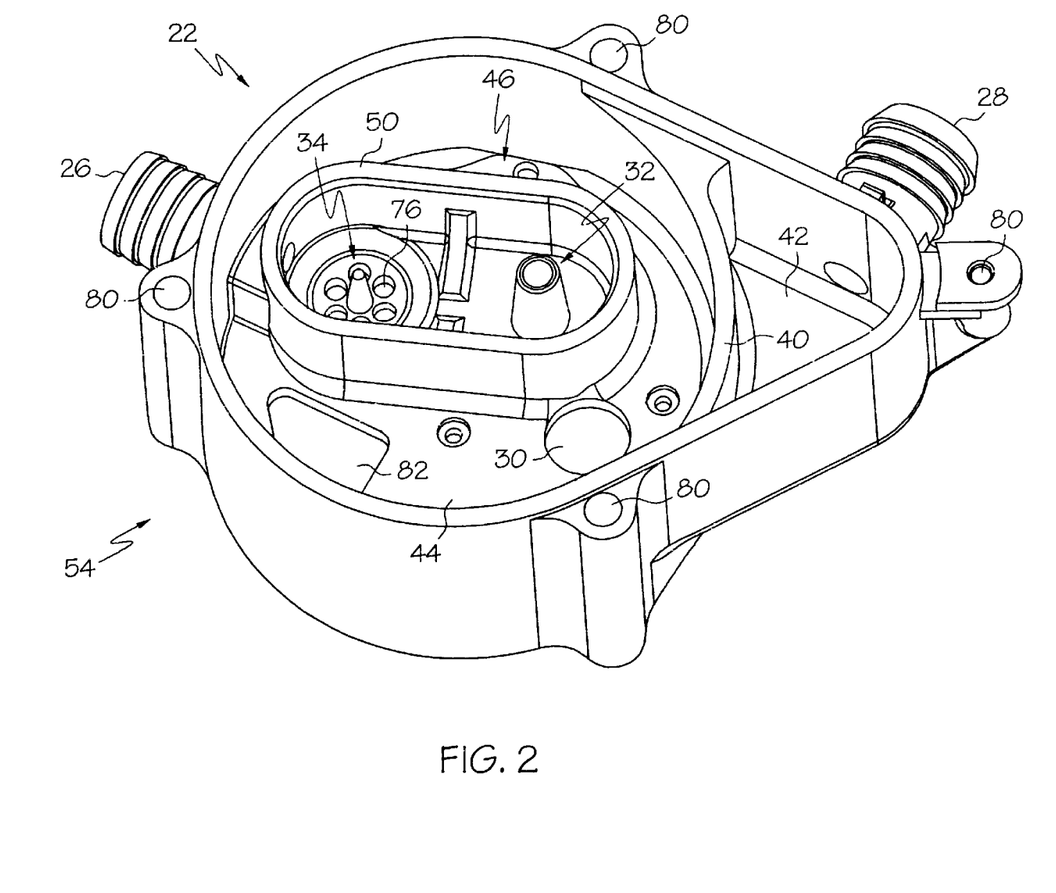
FIG. 2 is perspective view of a first embodiment of an open-top manifold housing of the block-diagram-shown manifold assembly of FIG. 1 including the open-top container of the valve enclosure portion of the open-top manifold housing.
Figure 3:
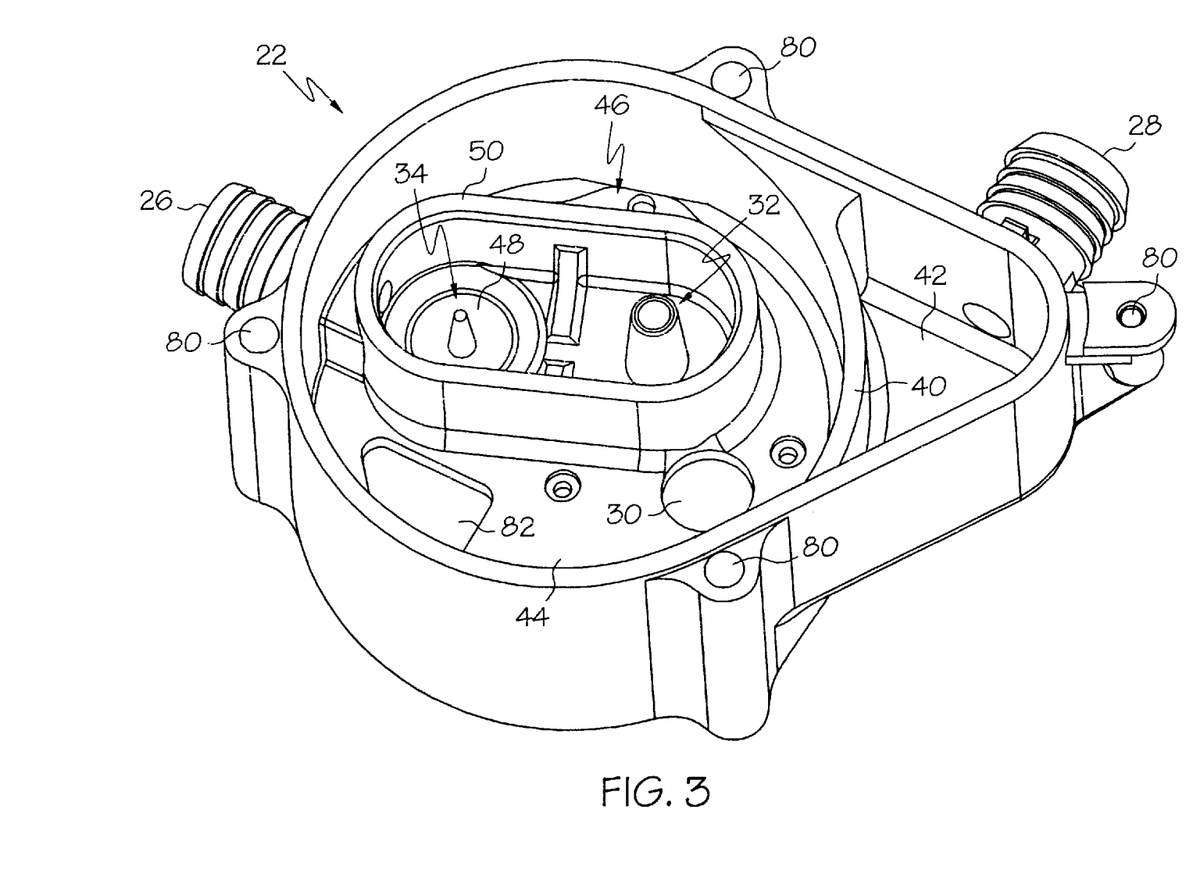
FIG. 3 is a view, as in FIG. 2, also showing an added elastomer disc of the vacuum-pump check valve of the valve enclosure portion.

Referring now to the drawings, FIGS. 1–10 illustrate a first embodiment of the present invention. A first expression of the first embodiment is for a manifold assembly 10 for pneumatically interconnecting an engine 12 to a brake booster 14 and for pneumatically interconnecting an inlet 16 of an electrically-driven vacuum pump 18 to the brake booster 14 and an outlet 20 of the vacuum pump 18 to the engine 12, as seen in FIG. 1. The manifold assembly 10 comprises an open-top manifold housing 22 (seen in whole or in portion in FIGS. 2, 3 and 6–8) coverable by a manifold cover 24 (seen in FIG. 9). The open-top manifold housing 22 has an engine port 26, a booster port 28, an orifice 30, an engine check valve 32 and a vacuum-pump check valve 34. The engine port 26 is pneumatically communicable with the engine 12. The booster port 28 is separate from the engine port 26 and is pneumatically communicable with the brake booster 14. The orifice 30 is pneumatically communicable with the inlet 16 of the vacuum pump 18. The engine check valve 32 allows pneumatic flow from the booster port 28 to the engine port 26 but substantially blocks pneumatic flow from the engine port 26 to the booster port 28. The vacuum-pump check valve 34 allows pneumatic flow from the outlet 20 of the vacuum pump 18 to the engine port 26 but substantially blocks pneumatic flow from the engine port 26 to the outlet 20 of the vacuum pump 18.

In one construction, the engine port 26 is pneumatically communicable with the engine 12 (e.g., with the engine intake manifold, not shown) via a pneumatic hose 36, and the booster port 28 is pneumatically communicable with the brake booster 14 via a pneumatic hose 38 (or a grommet, not shown). In the same or a different construction, the vacuum pump 18 (including the pump and motor portions) is contained in a vacuum-pump housing (not shown) which is mountable to the brake booster 14. In the same or a different construction, the vacuum-pump housing is attachable to (the bottom of) the open-top manifold housing 22. In one application, the engine 12 is an automotive engine, and the vacuum pump 18 is an automotive-battery-driven vacuum pump. Other constructions and applications are left to the artisan.

In one example, the open-top manifold housing 22 has a structural rib 40 dividing the open-top manifold housing 22 into pneumatically-interconnected first and second chambers 42 and 44, wherein the first chamber 42 is disposed proximate the booster port 28, and wherein the second chamber 44 contains the orifice 30. In one modification, the open-top manifold housing 22 is substantially tear-drop shaped. In one variation, the second chamber 44 is substantially circular shaped.

Figure 4:
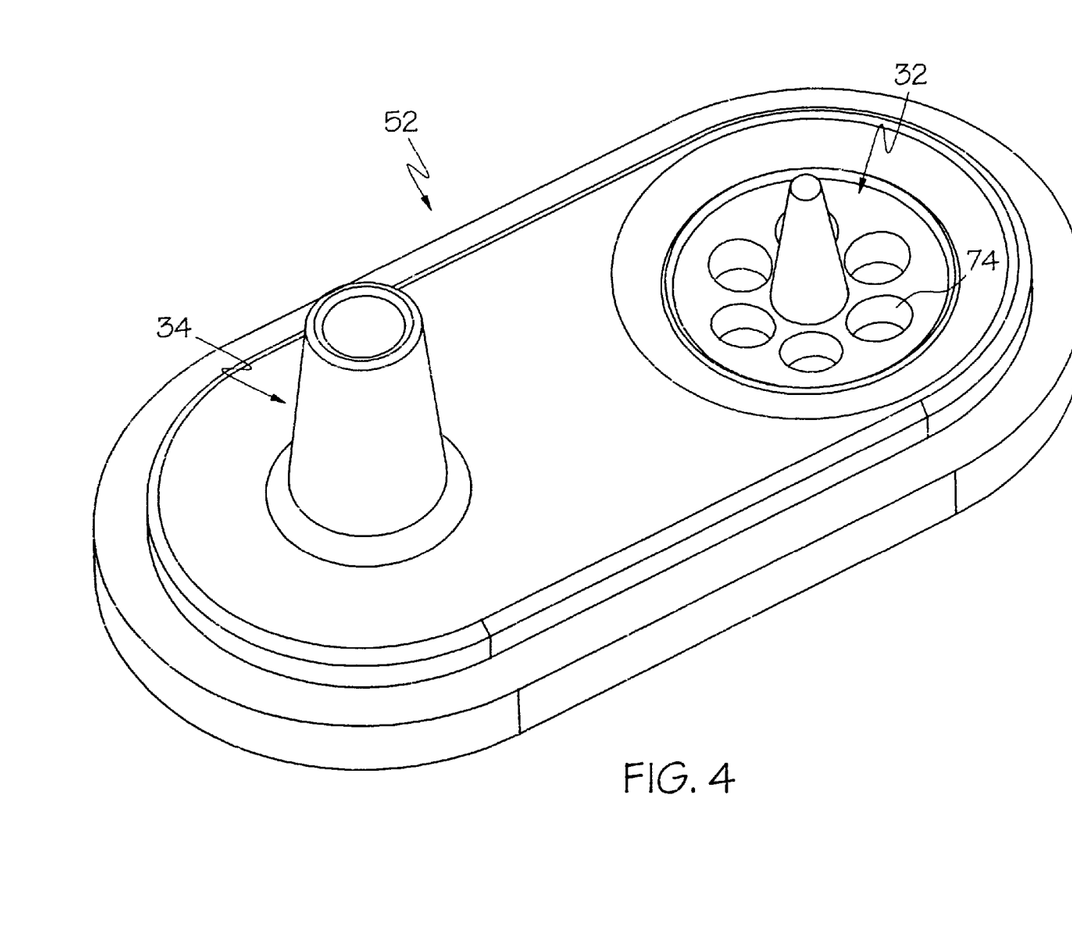
FIG. 4 is an underside perspective view of a first embodiment of a single valve cap of the valve enclosure portion whose open-top container is shown in FIGS. 2 and 3.
Figure 5:
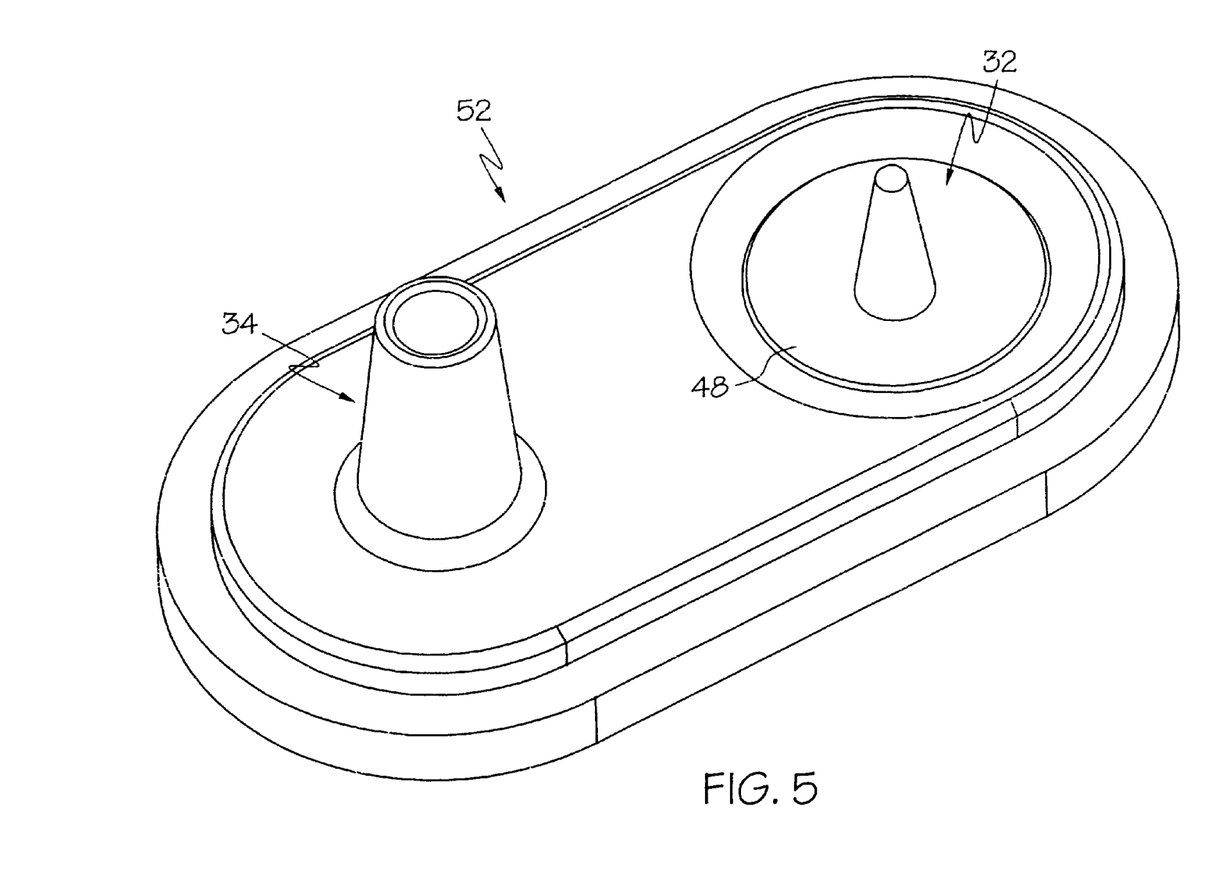
FIG. 5 is a view, as in FIG. 4, also showing an added elastomer disc of the engine check valve of the valve enclosure portion.

In the same or a different example, the open-top manifold housing 22 has a valve enclosure portion 46 which (shown in its entirety in FIGS. 6 and 7) is in pneumatic communication with the engine port 26, which contains the engine check valve 32, and which contains the vacuum-pump check valve 34. In one arrangement, the separate check valves each are of conventional design as shown in the figures and as understood by the artisan. In one conventional arrangement, the engine and vacuum-pump check valves 32 and 34 each include an elastomer disc 48. In one construction, the valve enclosure portion 46 (includes an open-top container 50 (best seen in FIGS. 2 and 3) and a single valve cap 52 (seen in FIGS. 4 and 5) sonically (i.e., ultrasonically) welded (when the parts are plastic) to the open-top container. In one modification, the open-top manifold housing 22, except for the elastomer discs 48 and the single valve cap 52, define a monolithic structure 54 (seen in FIG. 2). In one variation, the monolithic structure 54 comprises injection molded plastic. In one design, the single valve cap 52 is a monolithic valve cap.

In the same or a different example, (the bottom of) the open-top manifold housing 22 includes a plurality of vacuum-pump locating tabs 56. In one application, the vacuum-pump locating tabs 56 engage corresponding grooves (not shown) on the vacuum pump 18 for proper alignment and ease of assembly when the vacuum-pump housing (not shown) is attached to (the bottom of) the open-top manifold housing 22.

In the same or a different example, the manifold assembly 10 includes a vacuum-pump-housing ring seal 58 (seen in FIG. 8) attached to (the bottom of) the open-top manifold housing 22, and the manifold assembly 10 includes a vacuum-pump seal 59 (seen in FIG. 8) attached to (the bottom of) the open-top manifold housing 22 and surrounding the orifice 30 and the vacuum-pump check valve 34. In one construction, the vacuum-pump-housing ring seal 58 and the vacuum-pump seal 59 each comprise an elastomer and each are over-molded to (the bottom of) the open-top manifold housing 22. In the same or a different example, the vacuum-pump seal 59 includes a vacuum-pump vibration-isolator portion 60 (seen in FIG. 8).

Figure 6:
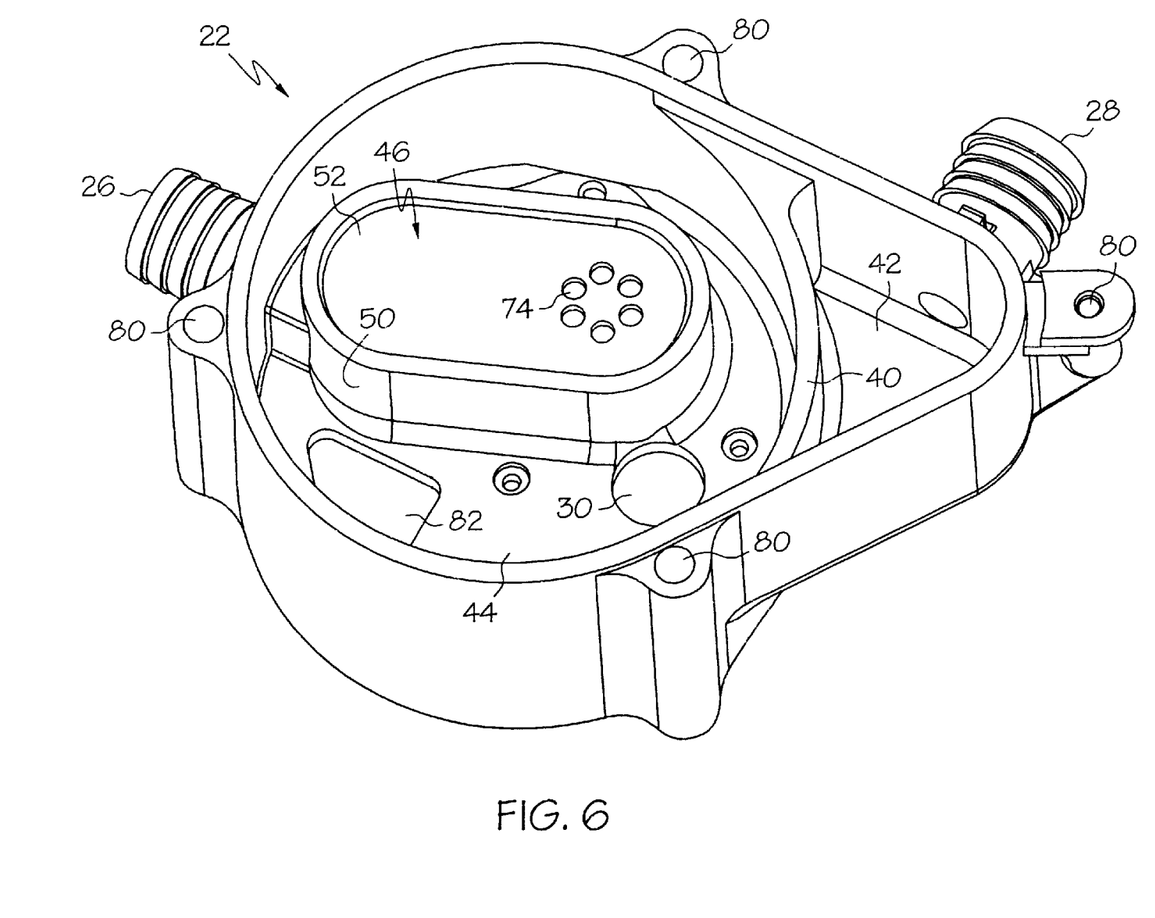
FIG. 6 is a view, as in FIG. 3, but with the single valve cap of FIGS. 4 and 5 sonically welded to the open-top container of the valve enclosure portion.
Figure 7:
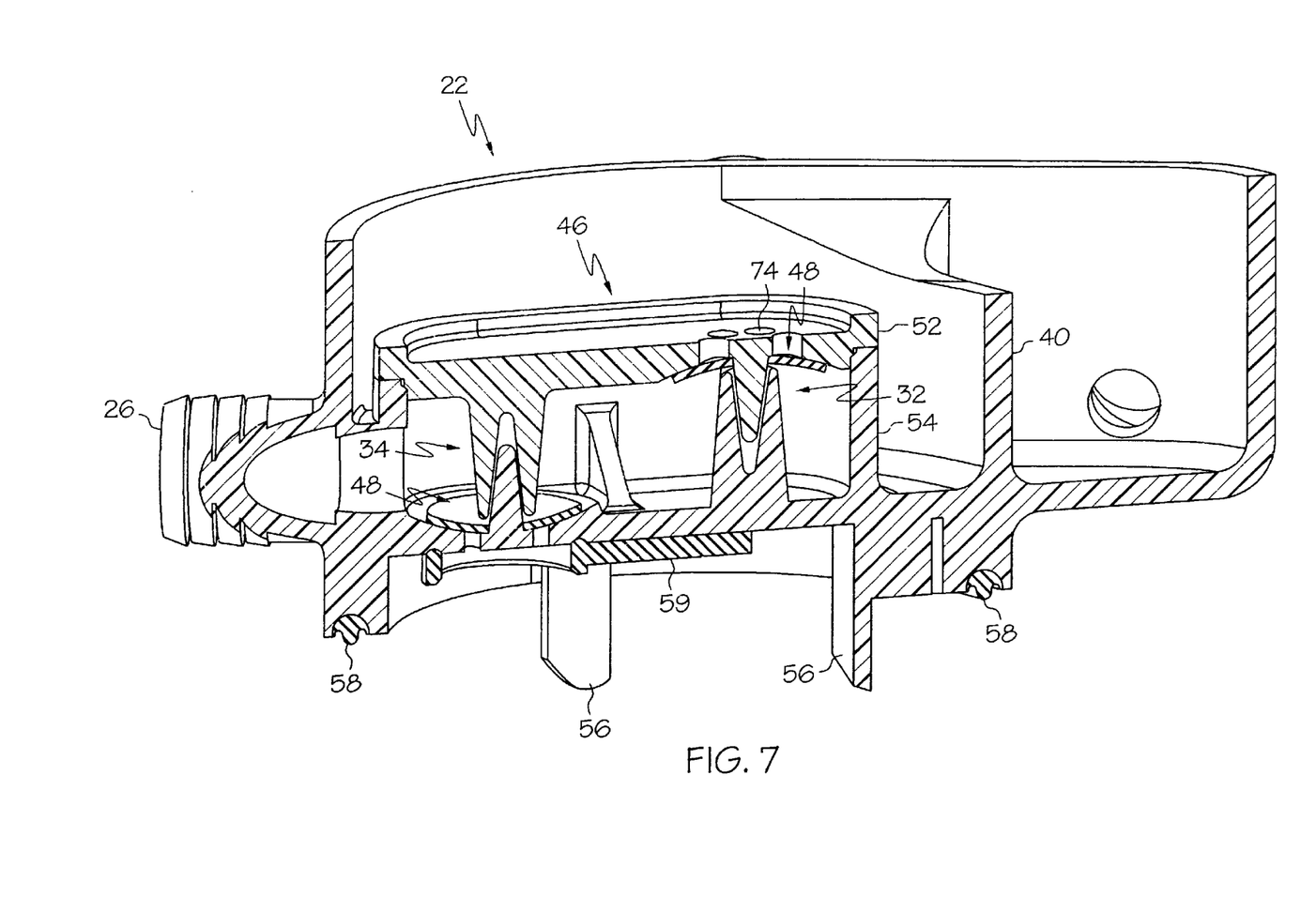
FIG. 7 is a partial-cutaway view of the open-top manifold housing of FIG. 6.
Figure 8:
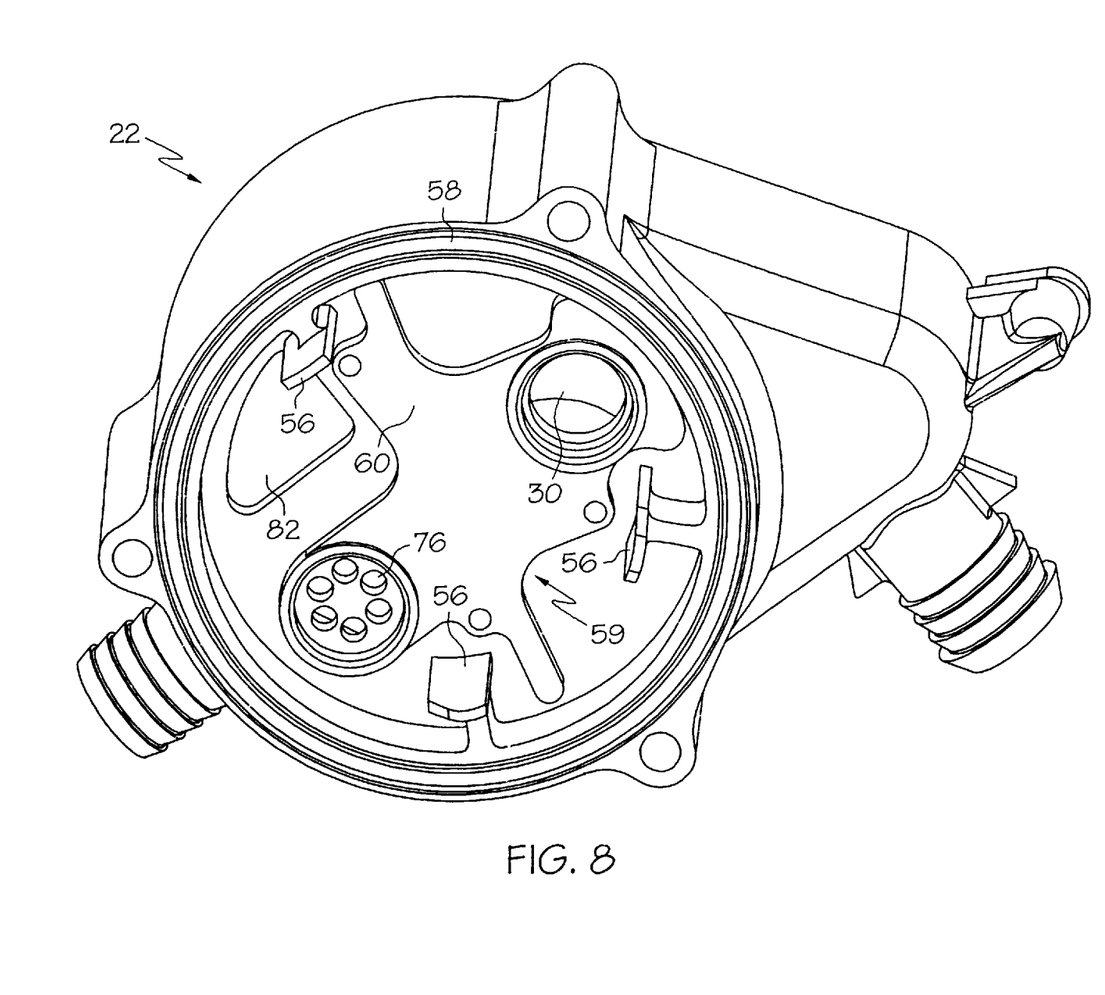
FIG. 8 is an underside view of the open-top manifold housing of FIG. 6.
Figure 9:
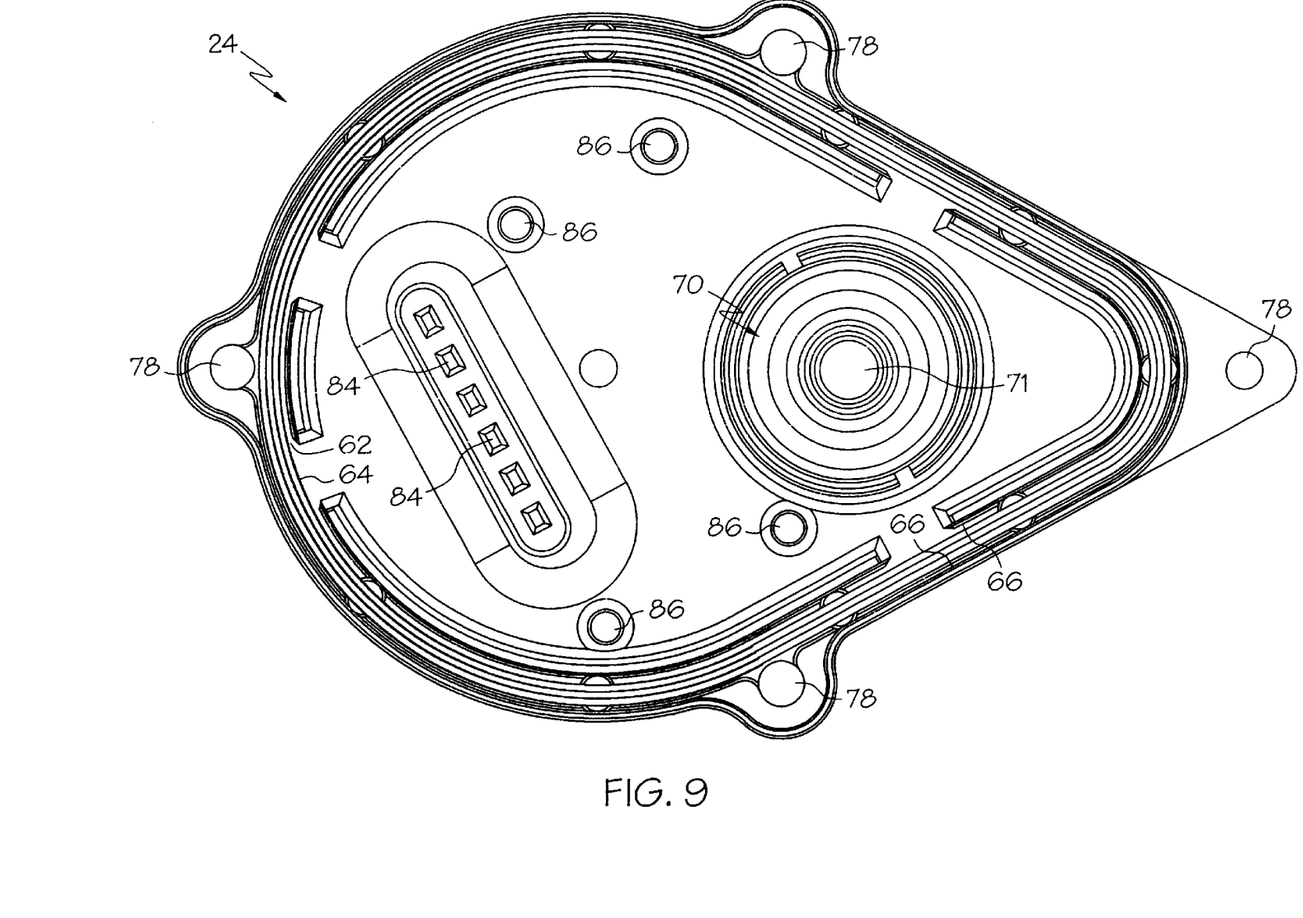
FIG. 9 is an underside view of a first embodiment of a manifold cover showing the perimeter groove of the manifold cover and a first embodiment of a perimeter seal disposed in the perimeter groove.
Figure 10:
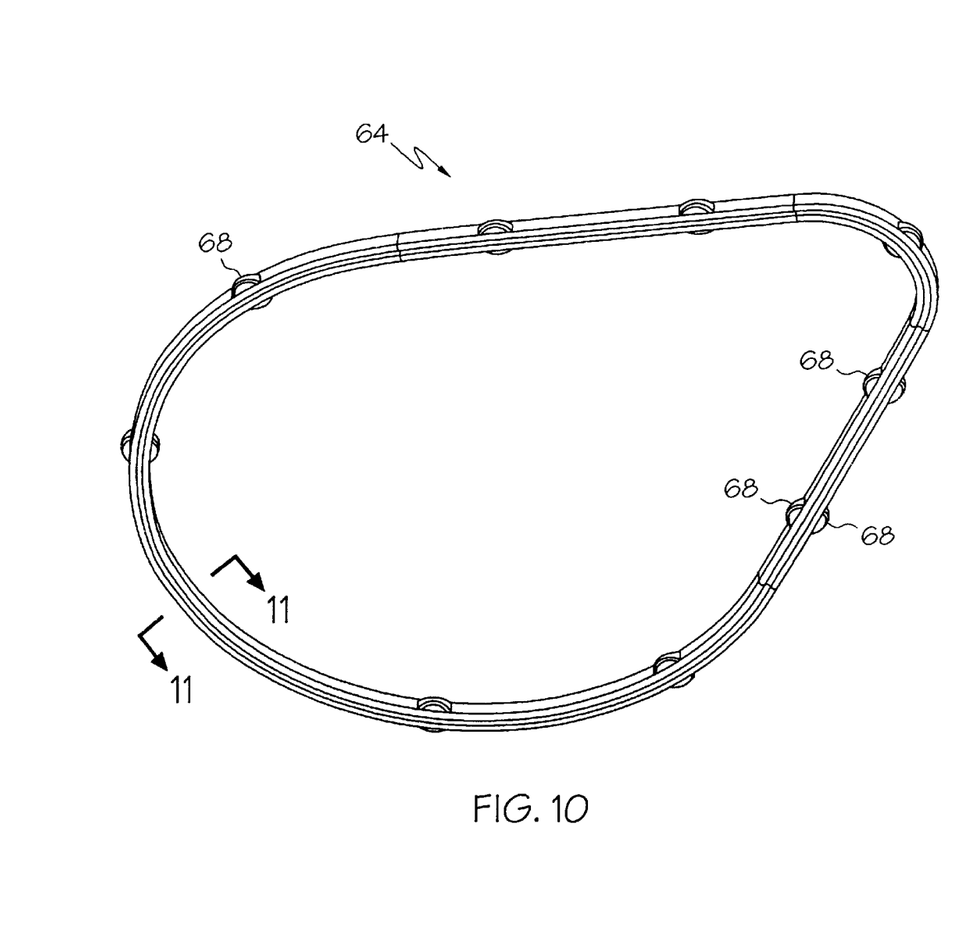
FIG. 10 is a front view of the perimeter seal of FIG. 9.
Figure 11:
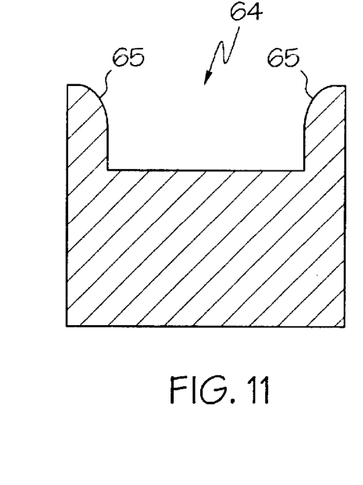
FIG. 11 is a cross-sectional view of FIG. 10 taken along lines 11—11 of FIG. 10.

In the same or a different example, the manifold assembly 10 also includes the manifold cover 24 (seen in FIG. 9) attached (such as by bolts, not shown) to (the top of) the open-top manifold housing 22 (seen in FIG. 6). In one construction, the manifold cover 24 includes a perimeter groove 62. In one application, the manifold assembly 10 includes a perimeter seal 64 (such as an elastomer seal) disposed in the perimeter groove 62 and engaging (the top of) the open-top manifold housing 22. In one modification, the perimeter seal 64 is a double lip seal (having two lips 65 as seen in FIG. 11) for more secure sealing as can be appreciated by the artisan. In one variation, the perimeter groove 62 has two annular spaced apart sides 66, and the perimeter seal 64 includes transversely extending tabs 68 transversely engaging the sides 66 of the perimeter groove 62 for locating and securing the perimeter seal during assembly of the manifold cover to (the top of) the open-top manifold housing. In one design, the transversely extending tabs 68 include inwardly extending tabs and outwardly extending tabs as shown in FIG. 10. In one arrangement, as shown in FIG. 9, the manifold cover 24 includes a pressure sensor receptacle 70 (including a hole 71). In one application, a differential-pressure-sensing sensor (not shown) activates the vacuum pump 18 when differential pressure between the outside and the inside of the manifold assembly 10 indicates the vacuum pump should be activated to pneumatically power the brake booster 14 such as (but not limited to) an emergency when the engine has failed (or possibly when at high altitudes) and the brake booster would be inoperative (or possibly in need of augmentation).

A second expression of the first embodiment shown in the figures is for a manifold assembly 10 for pneumatically interconnecting an engine 12 to a brake booster 14 and for pneumatically interconnecting an inlet 16 of an electrically-driven vacuum pump 18 to the brake booster 14 and an outlet 20 of the vacuum pump 18 to the engine 12, as seen in FIG. 1. The manifold assembly 10 comprises a manifold housing 72 (seen in FIG. 1 and portions seen in FIGS. 2, 3 and 6–9). The manifold housing 22 has an engine port 26, a booster port 28, an orifice 30, an engine check valve 32 and a vacuum-pump check valve 34. The engine port 26 is pneumatically communicable with the engine 12. The booster port 28 is separate from the engine port 26 and is pneumatically communicable with the brake booster 14. The orifice 30 is pneumatically communicable with the inlet 16 of the vacuum pump 18. The engine check valve 32 allows pneumatic flow from the booster port 28 to the engine port 26 but substantially blocks pneumatic flow from the engine port 26 to the booster port 28. The vacuum-pump check valve 34 allows pneumatic flow from the outlet 20 of the vacuum pump 18 to the engine port 26 but substantially blocks pneumatic flow from the engine port 26 to the outlet 20 of the vacuum pump 18. It is noted that in the second expression, the manifold assembly 10 is not limited to a construction involving an open-top manifold housing coverable by a manifold cover but allows for other housing enclosure designs, as can be appreciated by the artisan.

In one example of the second expression, the manifold housing 72 has a valve enclosure portion 46 which is in pneumatic communication with the engine port 26, which contains the engine check valve 32, and which contains the vacuum-pump check valve 34. In the same or a different example, the manifold housing 72 includes a pressure sensor receptacle 70.

A third expression of the first embodiment shown in the figures is identical to the previously-described second expression except the engine 12 is an automotive engine, the electrically-driven vacuum pump 18 is an automotive-battery-driven vacuum pump, and the limitations of the previously-described examples of the second expression are included.

In operation, for the first embodiment, when the engine 12 is drawing a vacuum on the brake booster 14, the pneumatic flow is from the brake booster 14 through pneumatic hose 38 (or a grommet, not shown) to the booster port 28, then to the first chamber 42, then across the rib 40 to the second chamber 44, then through the top holes 74 (near the disc 48 of the engine check valve 32) of the valve enclosure portion 46 and into the valve enclosure portion 46, then to the engine port 26, and then through pneumatic hose 36 to the engine 12.

In operation, for the first embodiment, when the vacuum pump 18 is drawing a vacuum on the brake booster 14, the pneumatic flow is from the brake booster 14 through pneumatic hose 38 (or a grommet, not shown) to the booster port 28, then to the first chamber 42, then across the rib 40 to the second chamber 44, then through the orifice 30, then into the inlet 16 of the vacuum pump 18, then out of the outlet 20 of the vacuum pump 18, then through the bottom holes 76 (near the disc 48 of the vacuum-pump check valve 34) of the valve enclosure portion 46 and into the valve enclosure portion 46, then to the engine port 26, and then through pneumatic hose 36 to the engine 12.

It is noted that bolt holes 78 in the manifold cover 24 match bolt holes 80 in the open-top manifold housing 22 for attaching these parts together. A wiring passageway 82 in (the bottom of) the open-top manifold housing 22 is identified in FIGS. 2, 3, 6 and 8, and a wiring pin passageway 84 in the manifold cover 24 is identified in FIG. 9. In one embodiment, a printed circuit board (not shown) is attached to the underside of the manifold cover 24 using pins 86.

Several benefits and advantages are derived from one or more of the expressions of a first embodiment of the invention. The manifold assembly reduces the number of parts otherwise required resulting in lower material costs, lower manufacturing costs, and higher quality. The manifold assembly frees up space that would otherwise be taken up by extensive plumbing connections. The manifold assembly acts as a noise reduction chamber and also routes the noise of the vacuum pump to the engine as can be appreciated by the artisan. The manifold assembly arrangement for the vacuum-pump check valve allows the vacuum-pump check valve to also act as an elastomeric valve which increases the performance of the vacuum pump by preventing backflow into the pump as can be appreciated by those skilled in the art. The pressure sensor receptacle can hold a differential-pressure-sensing sensor which can be used to activate and deactivate the vacuum pump such as activating the vacuum pump in the event of engine failure.

The foregoing description of a several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A manifold assembly for pneumatically interconnecting an engine to a brake booster and for pneumatically interconnecting an inlet of an electrically-driven vacuum pump to the brake booster and an outlet of the vacuum pump to the engine, Wherein the manifold assembly comprises an open-top manifold housing coverable by a manifold cover, and wherein the open-top manifold housing has:
   a) an engine port pneumatically communicable with the engine;
   b) a booster port separate from the engine port and pneumatically communicable with the brake booster;
   c) an orifice pneumatically communicable with the inlet of the vacuum pump;
   d) an engine check valve which allows pneumatic flow from the booster port to the engine port but substantially blocks pneumatic flow from the engine port to the booster port; and
   e) a vacuum-pump check valve which allows pneumatic flow from the outlet of the vacuum pump to the engine port but substantially blocks pneumatic flow from the engine port to the outlet of the vacuum pump.

2. The manifold assembly of claim 1, wherein the open-top manifold housing has a structural rib dividing the open-top manifold housing into pneumatically-interconnected first and second chambers, wherein the first chamber is disposed proximate the booster port, and wherein the second chamber contains the orifice.

3. The manifold assembly of claim 2, wherein the open-top manifold housing is substantially tear-drop shaped.

4. The manifold assembly of claim 3, wherein the second chamber is substantially circular shaped.

5. The manifold assembly of claim 1, wherein the open-top manifold housing has a valve enclosure portion which is in pneumatic communication with the engine port, which contains the engine check valve, and which contains the vacuum-pump check valve.

6. The manifold assembly of claim 5, wherein the engine and vacuum-pump check valves each include an elastomer disc, wherein the valve enclosure portion includes an open-top container and a single valve cap ultrasonically welded to the open-top container, and wherein the open-top manifold housing, except for the elastomer discs and the single valve cap, define a monolithic structure.

7. The manifold assembly of claim 6, wherein the monolithic structure comprises injection molded plastic.

8. The manifold assembly of claim 7, wherein the open-top manifold housing has a structural rib dividing the open-top manifold housing into pneumatically-interconnected first and second chambers, wherein the first chamber is disposed proximate the booster port, and wherein the second chamber contains the orifice and the valve enclosure portion.

9. The manifold assembly of claim 1, wherein the open-top manifold housing includes a plurality of vacuum-pump locating tabs.

10. The manifold assembly of claim 1, wherein the manifold assembly includes a vacuum-pump-housing ring seal attached to the open-top manifold housing, and wherein the manifold assembly includes a vacuum-pump seal attached to the open-top manifold housing and surrounding the orifice and the vacuum-pump check valve.

11. The manifold assembly of claim 10, wherein the vacuum-pump seal includes a vacuum-pump vibration-isolator portion.

12. The manifold assembly of claim 1, also including the manifold housing cover attached to the open-top manifold housing, wherein the manifold cover includes a perimeter groove, wherein the manifold assembly includes a perimeter seal disposed in the perimeter groove and engaging the open-top manifold housing.

13. The manifold assembly of claim 12, wherein the perimeter seal is a double lip seal.

14. The manifold assembly of claim 13, wherein the perimeter groove has two annular spaced apart sides, and wherein the perimeter seal includes transversely extending tabs transversely engaging the sides of the perimeter groove.

15. The manifold assembly of claim 14, wherein the transversely extending tabs include inwardly extending tabs and outwardly extending tabs.

16. The manifold assembly of claim 1, also including the manifold cover attached to the open-top manifold housing, wherein the manifold cover includes a pressure sensor receptacle.

17. A manifold assembly for pneumatically interconnecting an engine to a brake booster and for pneumatically interconnecting an inlet of an electrically-driven vacuum pump to the brake booster and an outlet of the electrical vacuum pump to the engine, wherein the manifold assembly comprises a manifold housing having:
   a) an engine port pneumatically communicable with the engine;
   b) a booster port separate from the engine port and pneumatically communicable with the brake booster;
   c) an orifice pneumatically communicable with the inlet of the vacuum pump;
   d) an engine check valve which allows pneumatic flow from the booster port to the engine port but substantially blocks pneumatic flow from the engine port to the booster port; and
   e) a vacuum-pump check valve which allows pneumatic flow from the outlet of the vacuum pump to the engine port but substantially blocks pneumatic flow from the engine port to the outlet of the vacuum pump.

18. The manifold assembly of claim 17, wherein the manifold housing has a valve enclosure portion which is in pneumatic communication with the engine port, which contains the engine check valve, and which contains the vacuum-pump check valve.

19. The manifold assembly of claim 18, wherein the manifold housing includes a pressure sensor receptacle.

20. A manifold assembly for pneumatically interconnecting an automotive engine to a brake booster and for pneumatically interconnecting an inlet of an automotive-battery-driven vacuum pump to the brake booster and an outlet of the vacuum pump to the engine, wherein the manifold assembly comprises a manifold housing, having:
   a) an engine port pneumatically communicable with the engine;
   b) a booster port separate from the engine port and pneumatically communicable with the brake booster;
   c) an orifice pneumatically communicable with the inlet of the vacuum pump;
   d) an engine check valve which allows pneumatic flow from the booster port to the engine port but substantially blocks pneumatic flow from the engine port to the booster port;
   e) a vacuum-pump check valve which allows pneumatic flow from the outlet of the vacuum pump to the engine port but substantially blocks pneumatic flow from the engine port to the outlet of the vacuum pump;
   f) a valve enclosure portion which is in pneumatic communication with the engine port, which contains the engine check valve, and which contains the vacuum-pump check valve; and
   g) a pressure sensor receptacle.

* * * * *